(12) United States Patent
Koefod et al.

(10) Patent No.: US 6,478,971 B1
(45) Date of Patent: Nov. 12, 2002

(54) PROCESS FOR REMOVING SULFATE FROM AN AQUEOUS SALT SOLUTION

(75) Inventors: Robert Scott Koefod, Maple Grove, MN (US); Richard Hunt Rose, III, Glendale, CA (US)

(73) Assignee: Cargill, Incorporated, Wayzata, IL (US)

( * ) Notice: Subject to any disclaimer, the term of this patent is extended or adjusted under 35 U.S.C. 154(b) by 11 days.

(21) Appl. No.: 09/667,956

(22) Filed: Sep. 21, 2000

(51) Int. Cl.⁷ .................................................. C02F 1/56
(52) U.S. Cl. ...................... 210/714; 210/727; 210/734; 210/738; 423/166; 423/554; 423/559
(58) Field of Search ............................... 210/713, 714, 210/724, 725, 726, 727, 734, 738; 423/158, 166, 544, 554, 559

(56) References Cited

U.S. PATENT DOCUMENTS

| | | | |
|---|---|---|---|
| 3,753,900 A | * 8/1973 | Moore ................. | 159/DIG. 13 |
| 3,882,019 A | * 5/1975 | Burke ........................ | 210/711 |
| 4,010,098 A | 3/1977 | Fassell .......................... | 71/12 |
| 4,024,055 A | * 5/1977 | Blann ......................... | 210/712 |
| 4,202,745 A | 5/1980 | Exner et al. ............. | 204/180 R |
| 4,261,960 A | * 4/1981 | Boryta ....................... | 159/903 |
| 4,277,447 A | 7/1981 | Chambers et al. ........... | 423/165 |
| 4,402,850 A | 9/1983 | Schörghuber ................ | 252/175 |
| 4,636,376 A | 1/1987 | Maloney et al. ............. | 423/475 |
| 4,652,381 A | * 3/1987 | Inglis ......................... | 210/722 |
| 4,654,157 A | 3/1987 | Fukunaga ..................... | 252/70 |
| 4,693,830 A | * 9/1987 | Thornton et al. ............... | 209/5 |
| 5,035,807 A | 7/1991 | Maree ........................ | 210/711 |
| 5,059,403 A | 10/1991 | Chen ........................... | 423/24 |
| 5,215,632 A | * 6/1993 | Fritts et al. .................... | 204/95 |
| 5,302,297 A | 4/1994 | Barthrope .................... | 210/728 |
| 5,350,495 A | * 9/1994 | Eriksson et al. ............. | 205/503 |
| 5,460,730 A | * 10/1995 | Czerny et al. ............... | 210/710 |
| 5,482,696 A | 1/1996 | Hönigschmid-Grossich et al. ............. | 423/552 |
| 5,587,088 A | 12/1996 | Bader ......................... | 210/729 |
| 5,637,228 A | 6/1997 | Becnel, Jr. et al. ......... | 210/702 |
| 6,001,246 A | * 12/1999 | Suenkonis ................. | 159/24.3 |

* cited by examiner

*Primary Examiner*—Peter A. Hruskoci
(74) *Attorney, Agent, or Firm*—Pauley Petersen Kinne & Erickson

(57) ABSTRACT

A simple, effective, cost-efficient method of precipitating sulfate in an aqueous salt solution and removing the precipitate from the solution. The steps of the method include diluting the solution and slowly adding a precipitant to the solution. By following this method, a sulfate precipitate settles out of the solution quantitatively and can be easily separated from the sulfate-free supernatant.

31 Claims, No Drawings

PROCESS FOR REMOVING SULFATE FROM AN AQUEOUS SALT SOLUTION

FIELD OF THE INVENTION

This invention relates to a process for removing sulfate from an aqueous salt solution by way of precipitation, and greatly simplifying separation of the sulfate free liquid from the precipitate.

BACKGROUND OF THE INVENTION

The use of soluble salts to precipitate sulfate out of an aqueous salt solution is well-known in general chemistry. Common applications of this basic chemistry are found, for example, in the desulfurization of photographic wash water, as well as the desulfurization of liquid bittern, to name a couple. More specifically, the use of calcium chloride to precipitate sulfate out of liquid bittern is a well-known practice. Liquid bittern is the bitter water solution of mainly magnesium chloride and some residual sulfate, remaining after sodium chloride is crystallized out of seawater.

The removal of sulfate from aqueous salt solutions is often carried out for purposes of purification of the solution, or for more extensive purposes, as in the case of liquid bittern. Sulfate tends to precipitate out of liquid bittern when the temperature drops, causing handling problems during transportation of the bittern to cooler climates and storage in cold climates. A primary end use of liquid bittern is as a deicer, which inherently requires its use in cold climates. Removal of the sulfate from liquid bittern alleviates storage and handling problems associated with the formation of settleable sulfate solids.

In the process of removing sulfate from liquid bittern, calcium chloride is typically added rapidly to the liquid bittern, resulting in a very finely divided dispersion of calcium sulfate precipitate. This dispersion requires expensive and time-consuming processing, such as centrifugation or filtration, to remove the precipitate.

There is thus a need or desire for a simple, effective, low-cost method for removing sulfate from an aqueous salt solution.

SUMMARY OF THE INVENTION

The present invention is directed to a method of precipitating sulfate in an aqueous salt solution and removing the precipitate from the solution. The method includes diluting the aqueous salt solution and slowly adding a precipitant to the solution.

The precipitant is slowly added to the aqueous salt solution, either after the solution has been diluted or simultaneously while diluting the solution. The mixture can be agitated by bubbling with air, or agitated by other mechanical means, during the addition of the precipitant such that most of the precipitant added will encounter entrained seed crystals of a sulfate precipitate, favoring growth on the seed crystals and sulfate precipitate particles that are large enough to readily settle to the bottom of the reaction tank. After addition of the precipitant solution is complete, the reaction mixture is allowed to stand undisturbed for between about 8 and about 24 hours, during which time the sulfate precipitate settles essentially quantitatively to the bottom of the tank. A flocculating agent may be added to the reaction mixture before it is allowed to settle to improve the clarity of the supernatant. After settling, the supernatant sulfate-free solution can be pumped from the tank.

There is no limit to how much the solution could be diluted, but it should be diluted to a specific gravity upper limit of about 1.35 or lower. The precipitant addition rate can be varied widely depending on the size of the specific operation and the degree of mixing that is possible. There is no lower limit on how slowly the precipitant can be added. It is important that the addition be slow enough that seed crystals from the first amount of precipitant added are present and able to react with subsequent precipitant as it is added. The precipitant cannot be added instantaneously to the solution. Another embodiment of this invention includes seeding the solution with sulfate precipitate before addition of the precipitant.

A preferred precipitant is calcium chloride, although other precipitants can be used. When calcium chloride is used as the precipitant, the calcium chloride reacts with the sulfate in the solution to form insoluble calcium sulfate, which precipitates from the solution.

The slow addition of precipitant coupled with dilution of the starting solution produces a sulfate precipitate that settles out of solution quantitatively, greatly simplifying separation of the sulfate-free liquid from the precipitate.

With the foregoing in mind, it is a feature and advantage of the invention to provide a simple, effective, cost-efficient method of removing sulfate from an aqueous salt solution.

DETAILED DESCRIPTION OF THE PRESENTLY PREFERRED EMBODIMENTS

Sulfate can be removed from an aqueous salt solution through addition of a precipitant and subsequent precipitation of the sulfate. However, the ease with which the precipitated sulfate can be separated from the supernatant liquid is highly dependent upon the specific manner in which the mixing of the solution and precipitant is carried out. Using the method of the invention, an aqueous salt solution can be economically desulfated in a simple batch process. This invention can be used in many different applications, including in the desulfurization of photographic wash water, as well as the desulfurization of liquid bittern.

One of the steps of the invention includes diluting the solution. More specifically, the solution is diluted to a specific gravity of less than about 1.35, preferably less than about 1.33. There is no lower limit to how much the solution could be diluted, but it should be diluted to an upper limit of about 1.35 or lower. Alternatively, in terms of another measure of dilution applicable for when the solution is liquid bittern, the bittern can be diluted to less than about 34%, preferably less than about 32% magnesium chloride.

Another step in the invention includes slowly adding a precipitant to the solution. The precipitant addition rate can be varied greatly, depending on the size of the operation, the degree of mixing that is possible, and the concentration of the solution. For example, in a well-mixed system, a calcium chloride precipitant (on an anhydrous basis) can be added at a rate of between about 0.05 pounds per hour per cubic foot and about 300 pounds per hour per cubic foot, preferably the calcium chloride can be added at a rate of between about 0.2 pounds per hour per cubic foot and about 30 pounds per hour per cubic foot, more preferably the calcium chloride can be added at a rate of between about 0.2 pounds per hour per cubic foot and about 4 pounds per hour per cubic foot. The precipitant should not be added instantaneously to the solution. There is no lower limit on how slowly the precipitant can be added. It is important that the addition of the precipitant be slow enough that seed crystals from the first amount of precipitant added are present and able to react with subsequent precipitant as it is added. Generally, the more poorly mixed the solution is, the more slowly the precipitant should be added.

A preferred precipitant, particularly when liquid bittern is the solution, is calcium chloride. In one embodiment of the invention, the liquid biftern can be seeded with calcium sulfate before the addition of calcium chloride to the solution. In another embodiment, calcium chloride can be added to "virgin" bittern, before the bittern has been concentrated to saturation in magnesium chloride. Other suitable precipitants for sulfate include soluble salts of calcium, barium, strontium, or lead, as well as other known equivalents.

The combination of diluting the starting solution and slowly adding the precipitant produces a sulfate precipitate that settles out of solution quantitatively, greatly simplifying separation of the sulfate-free supernatant from the precipitate. It is desirable that both dilution of the solution and slow addition of the precipitant be carried out for this process to work. If either one is neglected, the sulfate precipitate will not settle out quantitatively. It is believed that this method works by causing the sulfate crystals to grow larger and decrease the density of the liquor, both of which facilitate settling of the solid. In general, it appears that the more dilute the solution and the slower the addition of the precipitant, the better the sulfate precipitate settles out.

The aqueous salt solution is preferably agitated by bubbling with air, or agitated by any other mechanical means, during the addition of the precipitant such that most of the precipitant added will encounter entrained seed crystals of the sulfate precipitate, favoring growth on the seed crystals and leading to sulfate particles that are large enough to readily settle to the bottom of the reaction tank. After addition of the precipitant is complete, the reaction mixture is allowed to stand undisturbed for between about 8 and about 24 hours, preferably between about 12 and about 24 hours, during which time the sulfate precipitate settles essentially quantitatively to the bottom of the tank. After settling, the sulfate-free supernatant can be pumped from the tank.

Alternatively, the precipitant can be added to the aqueous salt solution with no mixing, simply allowing the precipitant to gradually diffuse into the solution. Once the precipitant has diffused into the solution, the mixture can be stirred briefly, or agitated by any other mechanical means, and then allowed to settle, thereby yielding a clear, desulfated supernatant.

A flocculating agent can be added to the reaction mixture before it is allowed to settle in order to improve the clarity of the supernatant. Suitable flocculating agents include anionic polymers, more particularly, non-toxic polyacrylamide-polyacrylate copolymers. For example, a copolymer of sodium acrylate and acrylamide is an effective flocculating agent. An example of one such flocculating agent in the form of a commercial product is Aqua Process 7607 Polymer, available from Aqua Process, Inc.

Depending on the concentration of the solution and how quickly the precipitant is added to it, the supernatant liquid can have varying degrees of turbidity, and addition of an anionic flocculent is very effective in removing this turbidity. For example, calcium chloride solution was slowly added to a sample of 35% magnesium chloride bittern, resulting in a supernatant liquid that was cloudy and analyzed as 0.29% sulfate. Another sample prepared in the identical manner, except that 10 ppm of Aqua Process 7607 Polymer was added, had a very clear supernatant liquid that did not have any detectable sulfate in it.

However, if the calcium chloride is added slowly to a more dilute bittern solution, the calcium sulfate settles out so effectively that the supernatant liquid is quite clear even without use of a flocculating agent. For instance, when calcium chloride was added slowly to 31% magnesium chloride bittern, a fairly clear supernatant liquid resulted which was analyzed as containing only 0.18% sulfate.

Addition of 2.5–10 ppm flocculating agent, such as Aqua Process 7607 Polymer anionic flocculating polymer, either prior to or after addition of the precipitant, removes residual turbidity from the desulfated solution. Maximum effectiveness appears to occur at about 10 ppm addition of Aqua Process 7607 Polymer. Increasing the amount of Aqua Process 7607 Polymer to 100 ppm does not appear to increase the clarity of the supernatant liquid or increase the settling of the sulfate precipitate. Typically, less flocculent is needed in large batches.

EXAMPLES

Sulfate was removed from liquid bittern by addition of calcium chloride solution to liquid bittern, precipitating calcium sulfate. In laboratory tests, calcium chloride solution was added dropwise through a separatory funnel to a beaker or 5 gallon pail containing bittern with continual stirring. Sulfate levels were determined by a turbidimetric method, using a HACH calorimeter, model DR700. Magnesium and calcium chloride concentrations were determined by a standard EDTA titration using calmagite indicator. Determination of residual free sulfate in liquid bittern following reaction with calcium chloride was determined by first centrifuging supernatant bittern to remove all suspended particles of calcium sulfate. One liter samples of liquid were stored in Imhoff cones for 7 days at 0 degrees Fahrenheit. While still cold, the volume of dense, settled solid was measured in the cone.

Example 1

In this example, different methods of mixing the precipitant into the solution were compared, as shown in Table 1.

TABLE 1

Comparison of Mixing Techniques

| Sample | Addition of Calcium Chloride to Solution | Solution | Supernatant Liquid in Settled Mixture (% by volume) |
|---|---|---|---|
| 1 | very rapid | 35% magnesium chloride bittern | 7% |
| 2 | added gradually over 20 minutes, with stirring | 31% magnesium chloride bittern | 89% |
| 3 | slowly mixed | 32.4% magnesium chloride bittern | 91% |

When calcium chloride was added very rapidly to a concentrated bittern solution (e.g. pouring the entire quantity of calcium chloride solution instantly into 35% magnesium chloride bittern with stirring), the settled mixture only contained about 7% by volume supernatant liquid. On the other hand, when the calcium chloride solution was added gradually over 20 minutes to 31% magnesium chloride bittern with stirring, the settled mixture contained 89% supernatant liquid by volume, and the supernatant liquid was fairly clear (it can be further clarified by using a flocculating agent, as described above). In another experiment, a sample of 32.4% magnesium chloride bittern was slowly mixed with calcium chloride, and the settled mixture was found to contain 91% supernatant liquid by volume. Another method that was found to give good settling of the calcium sulfate precipitate was to "layer" the calcium chloride solution gently onto the surface of the liquid bittern with no stirring (e.g. by spraying a mist of calcium chloride solution on the surface) and allowing the denser calcium chloride solution to slowly diffuse down to the bottom of the beaker. Subsequent gentle mixing followed by settling yielded a mixture with 86% supernatant liquid by volume. Slow addition of calcium chloride with concomitant mixing worked the best of all the methods tried.

Example 2

In this example, liquid bittern having 32% magnesium chloride was split into 4 samples. Each sample was reacted with differing levels of calcium chloride solution to provide a range of sulfate levels from 2.2% to 1.9%. These samples were compared over time, as shown in Table 2.

TABLE 2

Comparison of Sulfate Levels Over Time

| Sample | Sulfate Level | 1 Week | 1 Month |
| --- | --- | --- | --- |
| 1 | 2.2% | Substantial amount of precipitate | Substantial amount of precipitate |
| 2 | 2.1% | Substantial amount of precipitate | Substantial amount of precipitate |
| 3 | 2.0% | No precipitate | Sediment |
| 4 | 1.9% | No precipitate | 3 small crystals |

The samples were stored at 32 degrees Fahrenheit in sealed glass jars containing a piece of broken porcelain to provide nucleation sites for any crystal growth. After one week, samples containing 2.2% and 2.1% sulfate showed a substantial amount of precipitate; samples containing 2.0% and 1.9% sulfate showed no precipitate. After prolonged storage for one month at 32 degrees Fahrenheit, the 1.9% sulfate sample had only 3 small crystals on the bottom of the jar. Thus, bittern that will not be stored colder than 32 degrees Fahrenheit will be free of significant sediment formation if sulfate levels are kept below 1.9% and the magnesium chloride concentration is kept below 32%.

Example 3

In this example, the desulfating process of the invention was carried out on a large scale. Addition rates of precipitant and the amount of flocculating polymer were varied and compared, as shown in Table 3.

TABLE 3

Comparison of Sulfate Levels Yielded As Addition Rates and Amount of Flocculating Polymer Vary on a Large Scale

| Sample | Addition Rate of Calcium Chloride | Flocculating Polymer (ppm) | Sulfate Level |
| --- | --- | --- | --- |
| 1 | 4.5 hours | none | 0.02% |
| 2 | 9 hours | 5 | 0.0% at top of tank 0.47% in middle of tank |
| 3 | 4 hours | 2.5 | 0.55%–0.74% |

The desulfating process in this example was tested on 2500 gallon batches of liquid bittern in a polyethylene tank 12 feet in diameter and 4 feet high. Calcium chloride solution (33%) was added gradually by gravity feed to liquid bittern (<32% magnesium chloride) through a pipe spanning the top of the tank to which was attached 17 spigots. The heads of the spigots were interchangeable so that different sized spigot holes could be utilized to obtain different addition rates of calcium chloride. Slow stirring in the tank was carried out by a large paddle, 5 feet by 2 feet, attached to a DC motor and turning at about 1.5 RPM. After addition of the calcium chloride, the mixture was allowed to stand with no agitation overnight before sampling product (typically about 12 hours).

Addition rates of calcium chloride solution and the amount of flocculating polymer were varied. In the first run, calcium chloride solution was added over 4.5 hours and no flocculating agent was used, yielding a slightly turbid bittern with 0.02% sulfate. A second run in which the calcium chloride solution was added over 9 hours and 5 ppm of flocculating polymer was added after calcium chloride addition yielded a very clear bittern. A sample of this product taken from the top of the tank analyzed as 0.0% sulfate, and a sample pulled from the middle of the tank analyzed as 0.47% sulfate. Apparently, the slow mixing in the large pilot tank was inefficient. A third run was carried out in which the calcium chloride was added over 4 hours and 2.5 ppm of flocculating polymer was added after the calcium chloride. This yielded a slightly turbid product, which analyzed between 0.55% and 0.74% sulfate.

As described in this invention and demonstrated in the examples, aqueous salt solutions, such as liquid bittern, can be economically desulfated in a simple batch process. The steps for successful desulfating of liquid bittern include diluting the bittern to less than about 32% magnesium chloride and slowly adding calcium chloride solution with agitation. Addition of 2.5–10 ppm Aqua Process 7607 Polymer anionic flocculating polymer following calcium chloride addition removes residual turbidity from the desulfated bittern. Liquid bittern containing 30% magnesium chloride will produce <1% settleable solids when stored at 0 degrees Fahrenheit for 7 days if the sulfate level is <1.0%. Liquid bittern will produce little or no precipitate when stored at 32 degrees Fahrenheit for prolonged periods if the sulfate level is <1.9% and the magnesium chloride level is <32%.

While the embodiments disclosed herein are presently preferred, various modifications and improvements can be made without departing from the spirit and scope of the invention. The scope of the invention is indicated by the appended claims, and all changes that fall within the meaning and range of equivalents are intended to be embraced therein.

We claim:

1. A method of removing sulfate from an aqueous salt solution, comprising the steps of:

diluting the solution to a specific gravity of less than about 1.35;

adding a precipitant to the solution at a rate not to exceed 30 pounds per hour per cubic foot, wherein the precipitant comprises a soluble salt selected from the group consisting of calcium, barium, strontium, and lead; and separating a sulfate precipitate from a supernatant.

2. The method of claim 1, further comprising the step of agitating the solution during addition of the precipitant.

3. The method of claim 2, wherein the agitation includes bubbling the solution with air.

4. The method of claim 1, further comprising the steps of allowing time for the precipitant to diffuse into the solution and subsequently agitating the solution.

5. The method of claim 4, wherein the agitation includes stirring the solution.

6. The method of claim 1, further comprising the step of allowing the reaction mixture to stand undisturbed for between about 8 and 24 hours.

7. The method of claim 1, wherein the precipitant comprises a soluble salt of calcium.

8. The method of claim 1, wherein the precipitant comprises calcium chloride.

9. The method of claim 1, wherein the precipitant comprises a soluble salt of barium.

10. The method of claim 1, wherein the precipitant comprises a soluble salt of strontium.

11. The method of claim 1, wherein the precipitant comprises a soluble salt of lead.

12. The method of claim 1, wherein the aqueous salt solution comprises bittern.

13. The method of claim 1, further comprising the step of adding a flocculating agent to the solution.

14. The method of claim 13, wherein the flocculating agent comprises an anionic polymer.

15. The method of claim 13, wherein the flocculating agent comprises a copolymer of sodium acrylate and acrylamide.

16. A method of removing sulfate from an aqueous salt solution, comprising the steps of:

diluting the solution to a specific gravity of less than about 1.35;

adding a precipitant to the solution at a rate not to exceed 30 pounds per hour per cubic foot, wherein the precipitant comprises a soluble salt selected from the group consisting of calcium, barium, strontium, and lead;

adding a flocculating agent to the solution;

allowing the reaction mixture to stand undisturbed for at least about 8 hours; and separating a sulfate precipitate from a supernatant.

17. The method of claim 16, further comprising the step of agitating the solution during addition of the precipitant.

18. The method of claim 17, wherein the agitation includes bubbling the solution with air.

19. The method of claim 16, wherein the precipitant comprises calcium chloride.

20. The method of claim 19, further comprising the step of seeding the solution with calcium sulfate prior to adding the calcium chloride to the solution.

21. The method of claim 16, wherein the aqueous salt solution comprises bittern.

22. The method of claim 16, wherein the flocculating agent comprises an anionic polymer.

23. The method of claim 16, wherein the flocculating agent comprises a copolymer of sodium acrylate and acrylamide.

24. A method of removing sulfate from liquid bittern, comprising the steps of:

diluting the bittern to a specific gravity of less than about 1.35;

adding a precipitant to the bittern at a rate not to exceed 30 pounds per hour per cubic foot, wherein the precipitant comprises a soluble salt selected from the group consisting of calcium, barium, strontium, and lead;

adding a flocculating agent to the bittern;

allowing the reaction mixture to stand undisturbed for at least about 8 hours; and separating a sulfate precipitate from a supernatant.

25. The method of claim 24, further comprising the step of diluting the bittern to less than about 34% magnesium chloride.

26. The method of claim 24, further comprising the step of agitating the bittern during addition of the precipitant.

27. The method of claim 26, wherein the agitation includes bubbling the bittern with air.

28. The method of claim 24, wherein the precipitant comprises calcium chloride.

29. The method of claim 28, further comprising the step of seeding the bittern with calcium sulfate prior to adding the calcium chloride to the bittern.

30. The method of claim 24, wherein the flocculating agent comprises an anionic polymer.

31. The method of claim 24, wherein the flocculating agent comprises a copolymer of sodium acrylate and acrylamide.

* * * * *

UNITED STATES PATENT AND TRADEMARK OFFICE
CERTIFICATE OF CORRECTION

PATENT NO.    : 6,478,971 B1                                    Page 1 of 1
DATED         : November 12, 2002
INVENTOR(S)   : Robert Scott Koefod et al.

It is certified that error appears in the above-identified patent and that said Letters Patent is hereby corrected as shown below:

<u>Title page,</u>
Item [73], Assignee, delete first line in its entirety and in its place insert:
-- Cargill, Incorporated, Wayzata, MN --

Signed and Sealed this

Eighteenth Day of March, 2003

JAMES E. ROGAN
*Director of the United States Patent and Trademark Office*